United States Patent [19]

Gazzarrini et al.

[11] 3,929,665

[45] Dec. 30, 1975

[54] PROCESS FOR PREPARING LUMINESCENT MATERIALS BASED ON OXYSULPHIDES

[75] Inventors: Franco Gazzarrini; Paolo Aguzzi, both of Novara, Italy; Adriana Corsini-Mena, Moscow, U.S.S.R.

[73] Assignee: Montedison S.p.A., Milan, Italy

[22] Filed: May 29, 1974

[21] Appl. No.: 474,186

[30] Foreign Application Priority Data

May 30, 1973 Italy.................................. 24827/73

[52] U.S. Cl. ........................................ 252/301.4 S
[51] Int. Cl.² ........................................ C09K 11/46
[58] Field of Search .............................. 252/301.4 S

[56] References Cited
UNITED STATES PATENTS

| | | | |
|---|---|---|---|
| 3,515,675 | 6/1970 | Byler et al. | 252/301.4 S |
| 3,563,909 | 2/1971 | Schuil et al. | 252/301.4 S |
| 3,647,707 | 3/1972 | Gillooly et al. | 252/301.4 S |
| 3,705,858 | 12/1972 | Luckey et al. | 252/301.4 S |
| 3,706,666 | 12/1972 | Schuil | 252/301.4 S |

*Primary Examiner*—Jack Cooper

[57] ABSTRACT

There is disclosed a new process for preparing oxysulphides of yttrium, gadolinum or lanthanium doped with elements of the rare earth groups, that is to say oxysulphides of yttrium, gadolinum or lanthanium in which the base element is partially substituted by elements of the rare earths group and which, on excitation by ultraviolet radiations or by electrons, become luminescent and emit radiations in the visible spectrum.

An aqueous suspension or solution of an oxide, nitrate or halide of yttrium, gadolinum or lanthanium, an oxide, nitrate or halide of a rare earth element, and a sulphurating element, is subjected to a hydrothermal synthesis, optionally in the presence of a base for adjusting the pH of the aqueous medium to a pH of from 8 to 12; the solid product of the hydrothermal synthesis is filtered and dried; the dried solid product is mixed with a sulphurizing compound, subjected to a heat-treatment, reduced to a pulp in water and filtered and dried to obtain the oxysulphide having the desired degree of luminescence.

4 Claims, No Drawings excellent luminescent properties.

The process of the present invention has several important advantages over prior art processes. The hydrothermal synthesis permits to obtain a very homogeneous solid solution, in which elements M' and M'' are present already as oxysulphides. In consequence, the successive heat treatment is carried out only to crystallize the product up to the attainment of crystals having the desired size. The presence of sulphurizing agent has the sole purpose of avoiding the desulphurization of the product, therefore said heat-treatment can be conducted at relatively low temperatures and with small amounts of sulphurizing agent.

The process of this invention can also be used to prepare oxysulphides having a mixed-base and a mixed-doping element or, with obvious modifications, for the preparation of oxycalcohalides different from the oxysulphides, i.e. for the preparation of compounds having the following empirical formula:

$$M'_{2-x}M''_xO_2Ch$$

wherein:

M' is at least one element selected from among Y, Gd and La;

M'' is at least one element selected from among Eu, Tb, Sm, Er, Tm, Dy, Ho, Nd and Pr; and Ch is an element selected from among S, Se and Te.

The following examples are given to illustrate the invention and are not intended as limiting.

EXAMPLE 1

An autoclave having an inside volume of 100 cu. cm. is fed with 9.25 g of $Y_2O_3$ (99.9% purity), 0.76 g of $Eu_2O_3$ (99.9% purity), 2.5 g of elementary S, 5.75 g of $Na_2CO_3$ and water to fill 75% of the autoclave volume.

Once the autoclave has been closed, the temperature is raised to and maintained at 320°C, while a slight rotation of the autoclave imparts a certain stirring of its contents.

3 hours after the moment at which the heating is begun, the autoclave is allowed to cool in the air and then opened. The solid product is filtered, washed on a filter with distilled water and then dried at 110°C. The dried product is mixed (for 30 minutes in a ball mixer) with 2.7 g of elementary S and 3.3 g of $Na_2CO_3$.

The mixture thus obtained is introduced into an alumina cylindrical crucible (inside volume = 15 cu. cm.) provided with a plug (also made of alumina), that permits outflow of the evolving gases. The crucible is placed in an electric resistance tubular furnace heated to 1000°C.

After a 2-hour heat treatment at 1000°C, the crucible is taken out of the furnace and cooled down in the air. The cooled product is first reduced to pulp in water, then filtered and dried at 110°C. 10.5 g of a cathodoluminescent material are thus obtained, which consists of europiumdoped yttrium oxysulphide having the formula:

$$Y_{1.9}Eu_{0.1}O_2S.$$

Such material is in the form of particles, the weighed mean diameter of which is 6.5 $\mu$. The granulometric distribution is such that the percentage by weight of particles having a diameter smaller than 3 $\mu$ amounts to 3% while the percentage by weight of particles having a diameter exceeding 15 $\mu$ is equal to 8%.

When subjected to cathode excitation, the material emits predominantly red radiations with the following optical characteristics:

brilliance to cathodoluminescence : 110% with respect to an analogous commercial product of R.C.A.;

chromatic coordinates : X = 0.641, Y = 0.348.

EXAMPLE 2

The process of Example 1 is repeated with some variations:

3.80 g of thiourea (instead of elementary S in admixture with sodium carbonate) is used as sulphurizing agent in the hydrothermal synthesis, the temperature being kept at 300°C. During the heat treatment the temperature is maintained at 1050°C. The other operative modalities are the same as in Example 1.

10.2 g of a cathodoluminescent material are obtained, having characteristics as follows:

formula : $Y_{1.9}Eu_{0.1}O_2S$ weighed mean diameter of the particles : 7.2 $\mu$ particles with diameter <3 $\mu$ : 1.5% by weight particles with diameter >15 $\mu$ : 10% by weight brilliance to cathodoluminescence : 120% with respect to an analogous commercial product of R.C.A.

chromatic coordinates : X = 0.650; Y = 0.334

EXAMPLE 3

The process of Example 1 is repeated except that 2.50 g of elementary S in admixture with 4.30 g of NaOH are used as sulphurizing agent in the hydrothermal synthesis, the temperature being kept at 300°C.

During the heat treatment the temperature is maintained at 1100°C. The other operative modalities are like those of Example 1.

10.2 g of a cathodoluminescent product are obtained, exhibiting the following characteristics:

formula : $Y_{1.9}Eu_{0.1}O_2S$ weighed mean diameter of the particles : 7.5 $\mu$ particles with diameter <3 $\mu$ : 1.5% particles with diameter >15 $\mu$ : 11% brilliance to cathodoluminescence = 150% with respect to an analogous commercial product of R.C.A. a chromatic coordinates : X = 0.656; Y = 0.335.

We claim:

1. A process for preparing luminescent grade oxysulphides having the empirical formula $M'_{2-x}M''_xO_2S$, in which M' is an element selected from the group consisting of yttrium, gadolinium and lanthanium; M'' is an element selected from the group consisting of europium, terbium, samarium, erbium, thulium, dysprosium, holmium, neodymium, and praseodymium, and x is a number from 0.0002 to 0.2; which process is characterized in that a. an aqueous solution or suspension containing (1) element M' in the form of an oxide, a nitrate, or a halide, (2) element M'' in the form of an oxide, a nitrate or a halide, (3) a sulphurizing agent in an amount of from 100% to 200% of the stoichiometric amount necessary to form oxysulphides having said formula and selected from the group consisting of thiourea, sodium thiosulphate, elementary sulphur, and mixtures thereof and a basic compound selected from the group consisting of alkaline or ammonium hydroxides and carbonates in amount such as to adjust the pH to a value of from 8 to 12; is subjected to a hydrothermal synthesis in an autoclave at 200°–350°C for from 3 to 5 hours and under a pressure of from 15 to 150 atm;

PROCESS FOR PREPARING LUMINESCENT MATERIALS BASED ON OXYSULPHIDES

THE PRIOR ART

It is known that oxysulphides of the present type become luminescent and emit radiations in the visible spectrum when excited by ultraviolet radiations or electrons. In particular, materials which emit radiations in the visible spectrum when excited by electrons are called "cathodoluminescent" materials and are used, for instance, in the construction of color television screens.

The emission spectrum of such materials varies, mainly as a function of the nature of the radiations emitting compound and in particular as a function of the nature and concentration of the element of the rare earth group with which the oxysulphide is "doped." For example, the cathodoluminiscent color emitted by yttrium oxysulphide doped with europium, is red.

The known techniques for preparing luminescent compounds of the present kind generally involve starting with the oxides of the base element and the doping element, dissolving said oxides in suitable ratios in an inorganic acid, such as $HNO_3$, $HCl$ or $H_2SO_4$, and precipitating the two elements from the resulting solution in the form of a mixed oxalate; decomposing the oxalate at a temperature of from 600° to 1300°C, generally at about 1250°C for about 1 hour, to obtain a mixed oxide of the base element and doping element, intimately mixing the mixed oxide, generally in finely divided form, with a sulphurizing solid compound and treating the mixture for some hours, even 5 hours, at a temperature comprised between 900° and 1300°C, preferably at 1100°C.

Both the heat treatment for decomposing the oxalate and the sulphurizing heat treatment require elevated temperatures and, altogether, long heating times. Furthermore, considerable amounts of sulphurizing compound 2-x required. The sulphurizing compound constitutes more than 40% by weight of the sulphuration charge and often reaches 70% by weight and that involves, consequently, a reduced utilization of the volume of the apparatus utilized for the heat-treatment.

THE PRESENT INVENTION

One object of this invention is to provide a new process for preparing, in a simple and economical way, oxysulphides having excellent luminescent characteristics.

This and other objects of the invention which will appear hereinafter are achieved by the present process for preparing luminescent oxysulphides having the empirical formula $M'_{2-x}M''_xO_2S$, in which M' is one of the elements yttrium, gadolinium and lanthanium; M'' is one of the rare earth elements europium, terbium, samarium, erbium, neodymium, thulium, dysprosium, holmium, and praseodymium; and x is a number ranging from 0.0002 to 0.2.

The process of the invention for producing said oxysulphides is characterized in that:

a. an aqueous suspension or solution containing (1) element M' in the form of an oxide, nitrate or halide, (2) element M'' in the form of an oxide, nitrate or halide, (3) a sulphurating element selected from amongst thiourea, sodium thiosulphate and elementary sulphur, optionally with the addition of a compound of basic nature selected from among the alkaline or ammonium hydroxides and carbonates, in order to bring the pH to a value comprised between 8 and 12, is subjected to a hydrothermal synthesis in an autoclave at 200°–350°C;

b. the solid product obtained at the conclusion of the hydrothermal synthesis is filtered and dried;

c. the dried solid product mixed with a sulphurizing compound selected from among alkaline thiosulphates, alkaline polysulphides and elementary sulphur with sodium carbonate is subjected to a heat treatment at 900° – 1100°C;

D. the solid product obtained at the conclusion of the heat treatment is reduced to pulp in water and, after filtration and drying, it constitutes the oxysulphide having the desired luminescent degree.

In the present process for preparing the oxysulphide $M'_{2-x}M''_xO_2S$ starting from the oxides, nitrates or halides of elements M' and M'', the oxide, nitrate or halide of element M' is mixed with the oxide, nitrate or halide of element M'' in such amount that the M''/M' molar ratio is equal to the ratio desired in the final oxysulphide.

The sulphurizing agent, selected from among thiourea, sodium thiosulphate and elementary sulphur, is employed in such amount that the sulphur corresponds to 100 – 200% of the stoichiometric amount required by formula $M'_{2-x}M''_x O_2S$.

The compound containing element M', the compound containing element M'' and the sulphurizing agent are introduced into an autoclave into which water and optionally a compound of basic nature, selected from among the alkaline or ammonium hydroxides and carbonates, are also fed, until the pH reaches a value ranging from 8 to 12.

In the solution or suspension subjected to the hydrothermal synthesis, the total concentration of elements M' and M'' is equal to 1–3 gram moles/liter.

Hydrothermal synthesis is usually carried out according to the following procedure. The autoclave is closed and heated until an operating temperature ranging from 200° to 350°C, preferably from 250° to 320°C, is attained. The pressure is the steam autogenous pressure at the various temperatures and generally ranges from 15 to 150 atm.

The hydrothermal synthesis is conducted for a time period of 3 to 5 hours. Such time periods include both the time required to bring the autoclave to the operating temperature and the time during which the autoclave is kept at such temperature.

At the conclusion of the hydrothermal synthesis, the autoclave is allowed to cool and then opened; the solid product, once filtered, washed and dried, is mixed with a sulphurizing agent and subjected to a crystallizing heat-treatment at 900° – 1100°C, for a time comprised between 30 minutes and 2 hours.

Alkaline thiosulphates, alkaline polysulphides or a mixture made up of from 30 to 60% of elementary sulphur and from 40 to 70% of sodium carbonate may be used as sulphurizing agent.

The sulphurizing agent constitutes less than 40% by weight, generally 10–35%, of the charge subjected to the crystallizing heat-treatment.

The heat-treatment may take place in a crucible, for instance of alumina, provided with a plug that in any case allows the outflow of the evolved gases.

After the heat treatment, the product is reduced to pulp in water, and then filtered and dried, thus providing the desired oxysulphide in the pure state and with b. the solid product obtained at the conclusion of the hydrothermal synthesis is filtered and dried;

c. the dried solid product is mixed with a sulphurizing agent selected from the group consisting of alkaline thiosulphates, alkaline polysulphides and a mixture made up of 30 to 60% by weight of elementary sulphur and from 40 to 70% by weight of sodium carbonate to form a charge which is subjected to a heat-treatment at 900°C to 1100°C for from 30 minutes to 2 hours, said sulphurizing agent constituting from 10% to less than 40% by weight of said charge; and d. the solid product obtained at the conclusion of the heat-treatment of (c) is reduced to pulp in water, filtered and dried.

2. The process according to claim 1, characterized in that in the aqueous solution or suspension subjected to hydrothermal synthesis, elements $M'$ and $M''$ are present in amounts such that their molar ratio is equal to the desired ratio in the oxysulphide to be prepared.

3. The process according to claim 1, characterized in that in the solution or suspension subjected to hydrothermal synthesis the total concentration of elements $M'$ and $M''$ is equal to 1–3 gram moles/liter.

4. The process according to claim 1, characterized in that the hydrothermal synthesis is conducted at a temperature comprised between 250° and 320°C.

* * * * *

UNITED STATES PATENT OFFICE
CERTIFICATE OF CORRECTION

Patent No. 3,929,665          Dated December 30, 1975

Inventor(s)     Franco Gazzarrini et al

It is certified that error appears in the above-identified patent and that said Letters Patent are hereby corrected as shown below:

Col. 1, line 40,    "2-x" should be - - - are - - -.

Col. 4, line 40,    "a"    after "R.C.A." should be deleted.

Signed and Sealed this twelfth Day of July 1977

[SEAL]

Attest:

RUTH C. MASON
*Attesting Officer*

C. MARSHALL DANN
*Commissioner of Patents and Trademarks*